July 29, 1958     S. E. THOMAS     2,845,003
BOMB ARMING SYSTEM
Filed Aug. 22, 1955
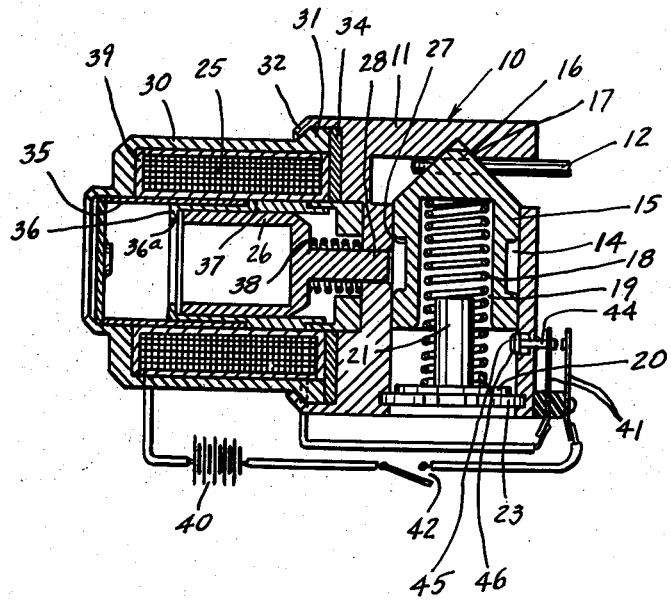
INVENTOR.
STEPHEN EDWARD THOMAS.
BY
Lockwood, Galt, Woodard + Smith.
ATTORNEYS.

United States Patent Office 2,845,003
Patented July 29, 1958

2,845,003

BOMB ARMING SYSTEM

Stephen E. Thomas, Fort Wayne, Ind., assignor to The Magnavox Company, Fort Wayne, Ind., a corporation Application August 22, 1955, Serial No. 529,799

5 Claims. (Cl. 89—1.5)

This invention relates generally to bomb arming systems and more particularly it relates to an electrically locked bomb arming solenoid.

Conventional bomb arming solenoids are energized by a bomber pilot when it is desired to drop bombs in armed condition. The arming switch is closed in the pilot's cockpit to energize the solenoid which remains energized until the bombs are dropped. The period of energization depends upon the time interval required to reach an on-target position whereby the solenoid structure including the coil must have sufficient current carrying capacity to avoid excessive temperature rise. Also, the power source must have sufficient capacity to withstand substantial current drain for an appreciable period of time. Coils and power sources meeting these requirements are relatively heavy. Since the weight of all apparatus carried in an aircraft must be limited to the greatest extent possible it becomes important to devise bomb arming devices and power sources having relatively small current requirements and minimum weight.

The principal object of this invention is to provide a bomb arming device having a lock system of such character that it may be energized over a minimum period of time, thereby to reduce rise of temperature in the solenoid and current drain on the power source.

Another object of this invention is to provide a bomb arming solenoid adapted to respond to motion of a bomb arming ring for effecting arming of a bomb when it is dropped.

Still another object of this invention is to provide a lock system for bomb arming solenoids of such character that the solenoid is energized only during the period of time required to initiate the release of a bomb.

In accordance with this invention there is provided a bomb arming system which comprises a bomb arming ring retainer mechanism, electro-motive means operatively associated with the retainer mechanism for locking it in position to retain a bomb arming ring or unlocking the retainer mechanism for releasing the bomb arming ring, and switch means operatively associated with said retainer mechanism for completing a circuit to said electro-motive means and energizing it only in response to a predetermined degree of movement of said bomb arming ring.

The full measure of the invention will be understood from the accompanying drawings and the following description and claims:

The single figure of the drawing is a longitudinal cross section of the bomb arming solenoid and lock system as provided in accordance with this invention. A schematic diagram of the solenoid control circuit is also shown.

Referring to the drawing, this invention comprises a bomb arming solenoid structure having a casing 10 slotted adjacent one end thereof to provide a retainer member 11 for the bomb arming ring 12. Within casing 10 there is provided a cylindrical chamber 14 within which is slidably supported a cylindrical retainer plunger 15 having a conical end 16 normally resting within a conical depression 17 in the retainer 11. For normally holding the plunger 15 in this position there is provided a coil spring 18 nested at one end within a cylindrical bore 19 in plunger 15. The other end of spring 18 engages a spring guide member having a base 20 and a spring guiding column 21 suitably mounted thereon. The spring guiding member may be held in position within the bore 14 by means of a snap ring 23 supported in an annular slot formed within casing 10 as shown in the drawing. Thus the spring 18 permits retraction of plunger 15 thereby to permit the bomb arming ring 12 to be thrust into the slot 11 after which plunger 15 will be moved by spring 18 into the position shown in the drawing for normally holding the bomb arming ring.

For locking or unlocking the plunger 15 to either cause the bomb arming ring 12 to be retained when a bomb is dropped or permit release of the bomb arming ring 12 when a bomb is dropped, there is provided a solenoid having a coil 25 and a core or plunger 26. The core 26 is conventional except that it includes as an integral part thereof, the latching member 28 which co-operates with groove 27 formed in plunger 15. When the coil 25 is energized the core 26 is moved to the right to move the latch 28 into groove 27 whereby the plunger 15 cannot move downwardly a distance sufficient to release bomb arming ring 12. On the other hand, when solenoid 25 is not energized, latch 28 does not enter groove 27 so that when a bomb is dropped it pulls the bomb arming ring 12 outwardly of groove 11 exerting a camming action on the conical end 16 of plunger 15 whereby plunger 15 is moved out of the way of bomb arming ring 12 permitting its release.

The solenoid structure includes an outer casing 30 having a flange 31 nested within an annular extension 32 of casing 10 so that the outer edge of extension 32 may be turned over the flange 31 to secure it in place. Casing 30 may be of magnetic material and the magnetic circuit for coil 25 may be completed by a washer 34 clamped between flange 31 of casing 30 and the end of casing 10. The magnetic circuit further comprises a cup member 35 which engages the outer end of casing 30 and the inner periphery of washer 34. Within the cup 35 there is mounted a non-magnetic sleeve member 36 having bosses 37 projecting through suitable holes in the cup 35 for retaining sleeve 36 in fixed position. The core or plunger 26 is slidably supported in the sleeve 36 and is normally urged to the left into engagement with the inwardly projecting collar 36a formed integrally with sleeve 36. Spring 38 is mounted over latch 28 and is compressed between casing 10 and the end of core 26 thereby normally to hold core 26 in engagement with collar 36a. A conventional spool 39 is provided for supporting the coil 25.

The electrical circuit for energizing coil 25 includes a power source 40 which may be a battery or converter, a pair of switch contacts 41 and a manually operable switch 42 all connected in series with coil 25. Switch 42 may be actuated by the pilot of a bomber to connect battery 40 with one of the switch contacts 41. For closing these contacts there is provided a slidable pin 44 mounted as shown in the casing 10 and including a head portion 45 having a sloping cam surface 46. The head member 45 may be located closely adjacent to the end of the plunger 15 so that during the initial movement of the bomb arming ring 12 the end of plunger 15 will cam the pin 44 outwardly to close contacts 41. This supplies power to coil 25 moving the core 26 to the right to actuate latch 28 whereby it enters the groove 27 and prevents the plunger 15 from moving far enough to release the bomb arming ring 12. Thus the bomb may be dropped in armed condition.

From the foregoing description it will be apparent that a bomber pilot may close switch 42 preparatory to dropping bombs in armed condition but coil 25 will not be energized until the bomb is actually released at which time contacts 41 will be closed to energize the coil 25. As soon as the bomb has been released and the arming ring 12 freed of the bomb, spring 18 will move plunger 15 back to its normal position opening contacts 41. It will be readily apparent that coil 25 is energized only for the period measurable in milli-seconds.

When it is desired to drop bombs in un-armed condition, switch 42 is left open and latch 28 remains in its normal position. As a result the bomb arming ring 12 falls with the released bomb and cams plunger 15 out of its way. The switch contacts 41 are closed but the circuit for coil 25 is opened at switch 42 so that coil 25 is not energized.

This invention provides the important advantage of requiring only momentary energization of coil 25 and because of this the coil may be formed of small gage wire having minimum weight. The power source 40 likewise is subjected to only momentary use and hence its size and weight may be reduced to the minimum.

The invention claimed is:

1. A bomb arming solenoid system comprising a casing having a bomb arming ring retainer, a plunger slidable in said casing and spring-biased into engagement with said retainer for holding said ring, a solenoid mounted to one side of said plunger on said casing and including a latch operatively associated with said plunger for locking or unlocking said plunger with respect to said retainer, a normally open electrical switch mounted in said casing in the way of said plunger and operable in response to releasing movement thereof, and an energizing circuit coupled to said solenoid and including a normally open, manually operable, control switch and said plunger operable switch in series for actuating said latch when both of said switches are closed.

2. A bomb arming system comprising a casing having a bomb arming ring retainer, a plunger slidable in said casing and normally positioned in engagement with said retainer for holding said ring, an electromotive means mounted on said casing and including a latch operatively associated with said plunger for locking or unlocking said plunger with respect to said retainer, a normally open electrical switch mounted in said casing in the way of said plunger and operable in response to releasing movement thereof, and an energizing circuit coupled to said electromotive means and including a normally open manually operable control switch and said plunger operable switch in series for actuating said latch when both of said switches are closed.

3. A bomb arming solenoid system comprising a casing having a bomb arming ring retainer, a plunger slidable in said casing and spring-biased into engagement with said retainer for holding said ring, a solenoid mounted to one side of said plunger on said casing and including a latch operatively associated with said plunger for locking or unlocking said plunger with respect to said retainer, an electrical switch operable in response to releasing movement of said plunger, and an energizing circuit coupled to said solenoid and including a manually operable control switch and said plunger operable switch for actuating said latch when both of said switches are actuated.

4. A bomb-arming system comprising a bomb-arming ring retainer, a plunger normally in engagement with said retainer for holding said ring and movable initially in arming ring releasing direction in response to movement of said ring, electromotive means mounted adjacent said plunger and including a latch associated with said plunger for locking or unlocking said plunger with respect to said retainer to control completion of the plunger movement into ring releasing position, an electrical switch operable in response to said initial releasing movement of said plunger, and an energizing circuit coupled to said electromotive means and including a manually operable control switch and said plunger operable switch for actuating said electromotive means momentarily to cause said latch to lock said plunger against completion of its ring releasing movement when a bomb is to be dropped in armed condition.

5. A bomb-arming solenoid system comprising a casing having a bomb-arming ring retainer, a plunger slidable in said casing and spring-biased into engagement with said retainer for holding said ring, said plunger being adapted to be moved in arming ring releasing direction in response to movement of said arming ring, a solenoid mounted to one side of said plunger on said casing and including a latch operatively associated with said plunger for locking or unlocking said plunger with respect to said retainer to control completion of the plunger movement into ring releasing position, and electrical means responsive to the initial movement of said plunger in arming ring releasing direction for energizing said solenoid momentarily to cause said latch to lock said plunger against completion of its ring releasing movement when a bomb is to be dropped in armed condition.

References Cited in the file of this patent
UNITED STATES PATENTS

| | | |
|---|---|---|
| 2,332,795 | Hooven | Oct. 26, 1943 |
| 2,430,617 | Quinnell et al. | Nov. 11, 1947 |